(12) United States Patent
Onaka

(10) Patent No.: US 12,724,328 B2
(45) Date of Patent: Sep. 1, 2026

(54) LENS BARREL UNIT

(71) Applicant: CANON KABUSHIKI KAISHA, Tokyo (JP)

(72) Inventor: Tomoya Onaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 18/630,813

(22) Filed: Apr. 9, 2024

(65) Prior Publication Data

US 2024/0345459 A1 Oct. 17, 2024

(30) Foreign Application Priority Data

Apr. 14, 2023 (JP) ................................ 2023-066475

(51) Int. Cl.
*G03B 17/14* (2021.01)

(52) U.S. Cl.
CPC .................................. *G03B 17/14* (2013.01)

(58) Field of Classification Search
CPC ...... H04N 23/55; H04N 23/687; H04N 23/57; G02B 7/006; G02B 5/20; G02B 7/08; G02B 7/021; G02B 6/022; G03B 17/14; G03B 17/12; G03B 11/00
USPC ........................................................ 359/889
See application file for complete search history.

(56) References Cited

U.S. PATENT DOCUMENTS

| | | | | |
|---|---|---|---|---|
| 2020/0329182 | A1* | 10/2020 | Fujiwara | H04N 23/54 |
| 2020/0329183 | A1* | 10/2020 | Onaka | G02B 7/021 |
| 2021/0141292 | A1* | 5/2021 | Onaka | G03B 11/00 |

FOREIGN PATENT DOCUMENTS

| | | | |
|---|---|---|---|
| CN | 103969924 | A | 8/2014 |
| JP | H03192231 | A | 8/1991 |
| JP | 2010156807 | A | 7/2010 |
| JP | 2011017801 | A | 1/2011 |
| JP | 2011041216 | A | 2/2011 |
| JP | 2011151590 | A | 8/2011 |
| JP | 2013195474 | A | 9/2013 |
| JP | 2017003993 | A | 1/2017 |
| JP | 2018510393 | A | 4/2018 |
| JP | 2020194031 | A | 12/2020 |

* cited by examiner

*Primary Examiner* — Marin Pichler
(74) *Attorney, Agent, or Firm* — Canon U.S.A., Inc., IP Division

(57) ABSTRACT

A lens barrel unit includes a lens unit including at least one lens, an optical-filter holding member, and a drive member. The optical-filter holding member holds an optical filter and is insertable into and removable from a light path of the at least one lens. The drive member inserts or removes the optical-filter holding member into or from the light path. The drive member further engages with the optical-filter holding member and has an opening penetrating in a direction of an optical axis of the at least one lens. At least part of the lens unit is arranged in the opening of the drive member.

8 Claims, 9 Drawing Sheets

5
14
15
13
25
21
20
23
170c
170a
170
18
171a
171c
171
19
24b
240a
241a
24
12
28
29
11
OA
X
Y
Z 24
12
19
17
Z
Y 12
24
17

12
18
24
19
170
171
170a
240a
241a
240c
171a
240c
241c
120c
121c
23A
24b
23
20

18
19
24
1700a
1710
1710a
2410a
2400a
23A
23
20A
11
1700
19
Z
Y

LENS BARREL UNIT

BACKGROUND

Field

The present disclosure relates to a lens barrel unit that includes a filter switching mechanism.

Description of the Related Art

There have been conventionally known lens barrel units that are equipped with a filter switching mechanism that causes an infrared cut filter or a neutral density (ND) filter to be inserted into or removed from a light path. For example, Japanese Patent Application Laid-Open No. 2020-194031 discusses a filter switching mechanism that causes a filter frame holding a filter to be inserted into or removed from a light path by an actuator using a worm gear.

SUMMARY

The present disclosure is directed to providing a lens barrel unit that includes a filter switching mechanism and can be reduced in size in the direction of an optical axis.

According to an aspect of the present disclosure, a lens barrel unit includes a lens unit including at least one lens, an optical-filter holding member configured to hold an optical filter and insertable into and removable from a light path of the at least one lens, and a drive member configured to insert or remove the optical-filter holding member into or from the light path, wherein the drive member further is configured to engage with the optical-filter holding member and has an opening penetrating in a direction of an optical axis of the at least one lens, and wherein at least part of the lens unit is arranged in the opening of the drive member.

Further features of the present disclosure will become apparent from the following description of exemplary embodiments with reference to the attached drawings.

DESCRIPTION OF THE EMBODIMENTS

Hereinafter, exemplary embodiments for carrying out the present disclosure will be described in detail with reference to the attached drawings.

Figure 1:
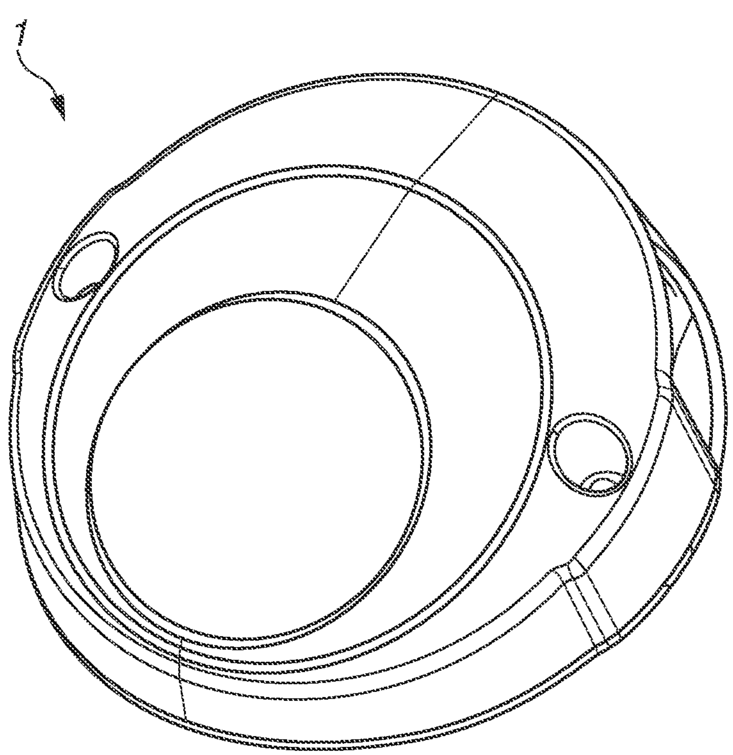
FIG. 1 is a perspective view of an imaging apparatus according to a first exemplary embodiment of the present disclosure.

Hereinafter, some exemplary embodiments of the present disclosure will be described in detail with reference to the attached drawings. FIG. 1 is a perspective view of an imaging apparatus 1 according to a first exemplary embodiment of the present disclosure. The imaging apparatus 1 includes a camera unit (optical device) 2.

Figure 2A:
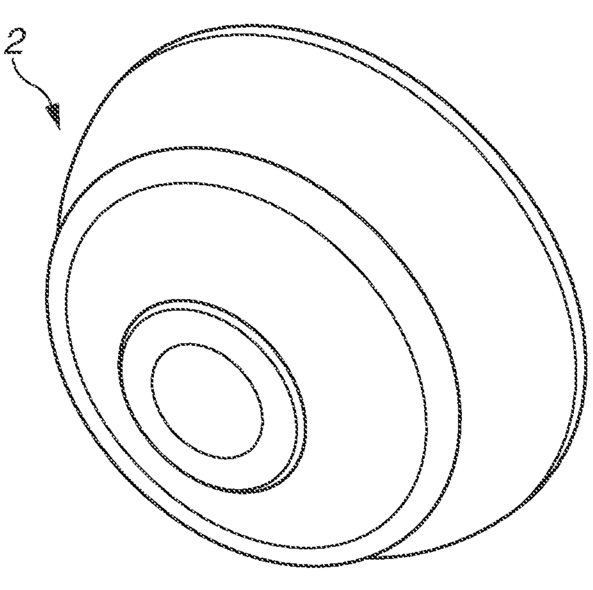
FIGS. 2A and 2B are a perspective view and a cross-sectional view of a camera unit according to the first exemplary embodiment, respectively, and each illustrate a state where an infrared cut filter is inserted into a light path.
Figure 2B:
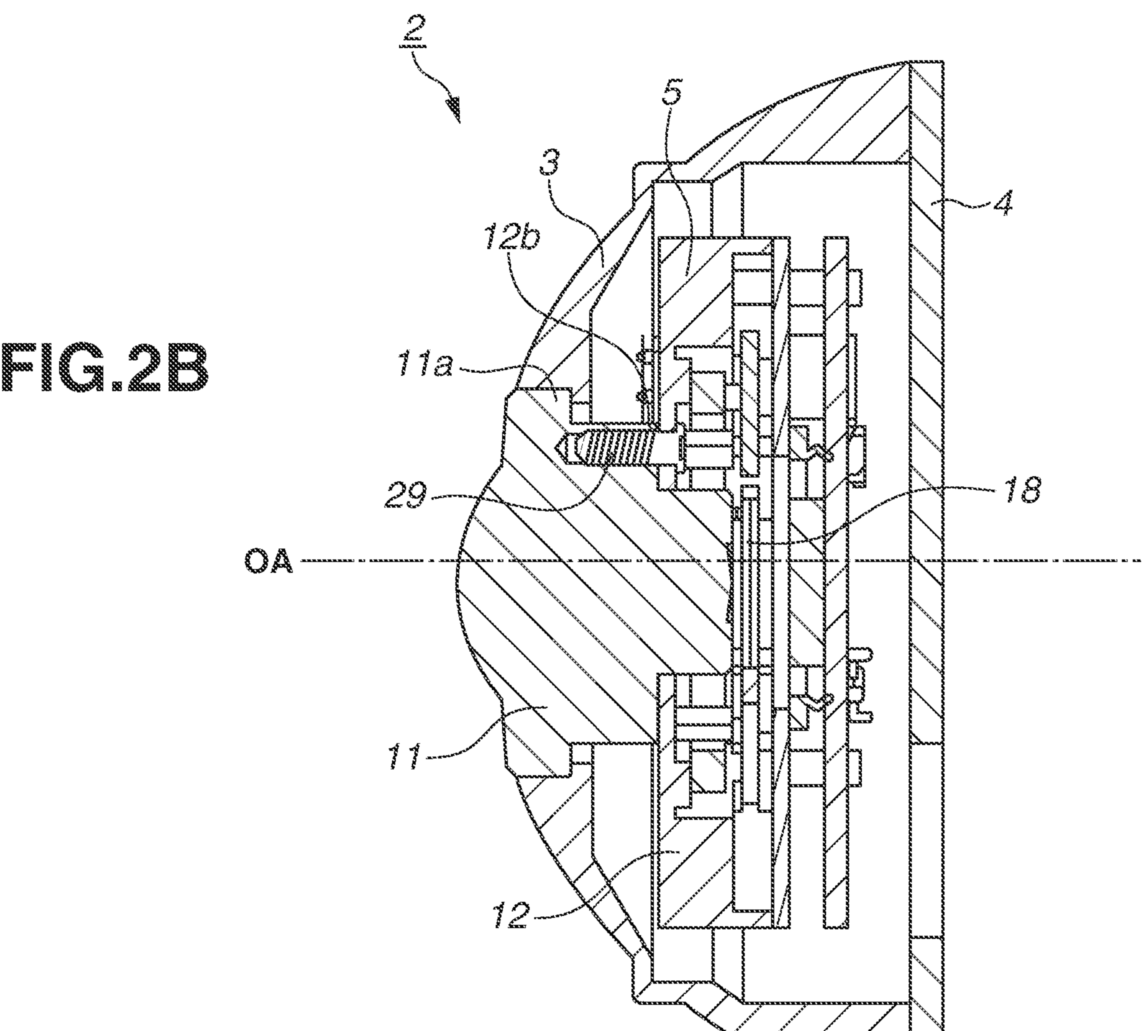

FIG. 2A is a perspective view of the camera unit 2, and FIG. 2B is a cross-sectional view of the camera unit 2 illustrated in FIG. 2A along an optical axis OA. The left side (subject side or object side) of FIG. 2A will be referred to as a front side, and the right side of FIG. 2A will be referred to as a back side. The camera unit 2 includes a front-side holder 3 and a back-side holder 4, and has a substantially hemispherical shape. The camera unit 2 has a lens barrel unit (lens apparatus) 5 therein. The lens barrel unit 5 is interposed and fixed between the front-side holder 3 and the back-side holder 4.

Figure 3:
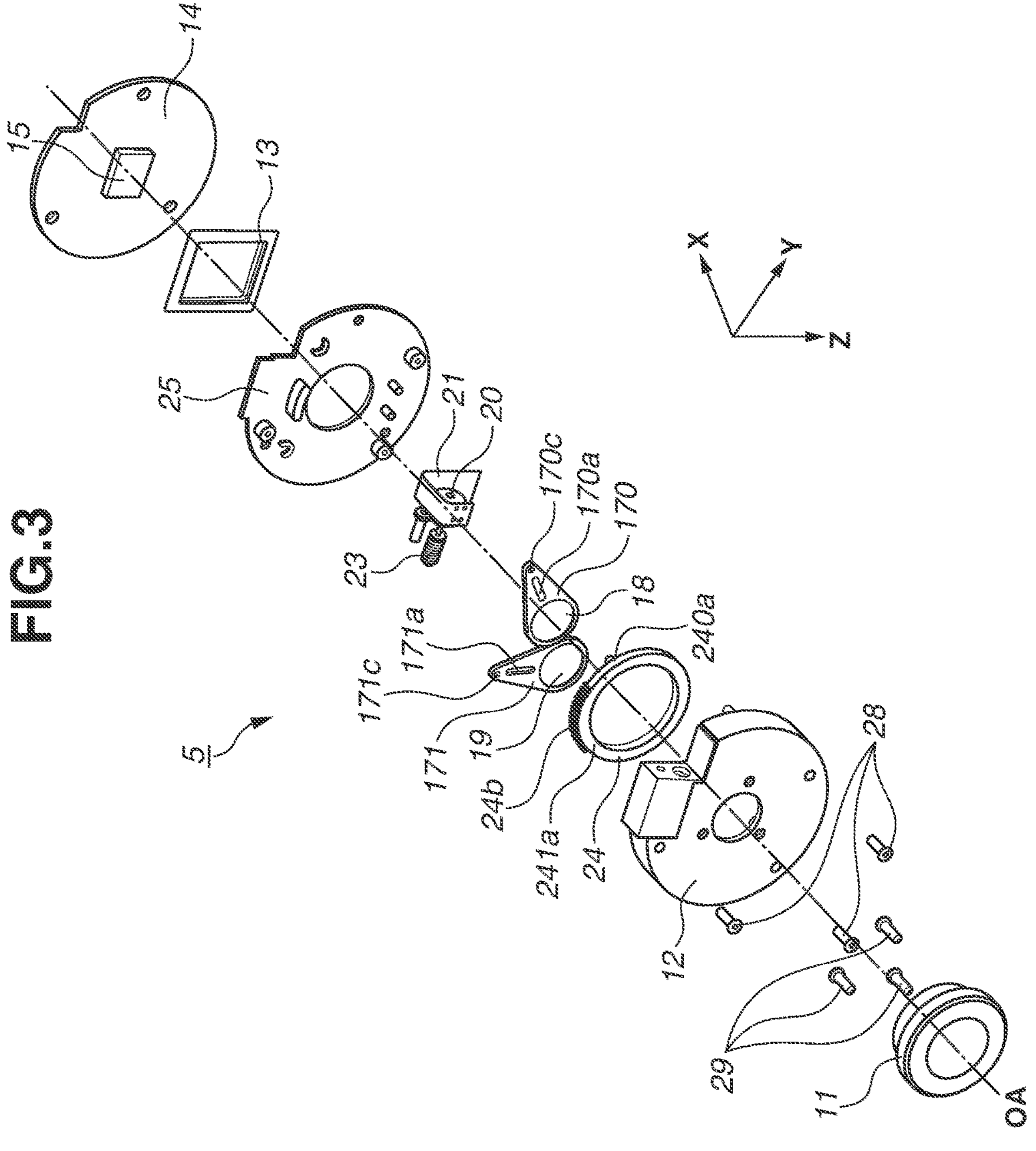
FIG. 3 is an exploded perspective view of a lens barrel unit according to the first exemplary embodiment.

FIG. 3 is an exploded perspective view of the lens barrel unit 5. The lens barrel unit 5 includes a lens unit 11, a fixing barrel 12, a dust-proof rubber 13, an imaging element substrate 14, filter holding frames 170 and 171, an actuator 20, and a cover member 25.

The lens unit 11 includes one or more lenses. The one or more lenses may be movable in the direction of the optical axis (X-axis direction) or may be immovable (fixed). The lenses may include a focus lens for focus adjustment and a zoom lens (magnification lens) that changes a focal length. As illustrated in FIG. 2B, the lens unit 11 has screw holes 11*a* formed therein. The fixing barrel 12 has attachment holes 12*b*. The screw holes 11*a* and the attachment holes 12*b* are fixed by screws 29, whereby the lens unit 11 is fixed to the fixing barrel 12. The fixing barrel 12 holds the lens unit 11. The fixing barrel 12 also holds the actuator 20 and supports an intermediate gear unit 24 described below so as to be rotatable between the fixing barrel 12 and the cover member 25. The fixing barrel 12 also includes guide shafts 120*c* and 121*c* (illustrated in FIG. 5A) that protrude toward the filter holding frames 170 and 171.

The dust-proof rubber 13 engages with the cover member 25 to prevent dust from entering the lens barrel unit 5. The dust-proof rubber 13 also suppresses vibration. The dust-proof rubber 13 is interposed between the cover member 25 and the imaging element substrate 14. The imaging element substrate 14 is a substrate on which an imaging element 15 is mounted and is fixed to the cover member 25. The imaging element 15 subjects an optical image formed via an imaging optical system to photoelectric conversion, and includes a photoelectric conversion element such as a charge-coupled device (CCD) sensor or a complementary metal oxide semiconductor (CMOS) sensor.

The filter holding frame 170 (optical filter holding member) holds an infrared cut filter (optical filter) 18 for shutting out infrared rays. The filter holding frame 171 (filter holding member) holds dummy glass 19. The filter holding frame 171 may hold a filter such as a neutral density (ND) filter, instead of the dummy glass 19. The filter holding frames 170 and 171 have engagement holes 170*a* and 171*a* (engaged portions) that penetrate through the filter holding frames 170 and 171 in the X-axis direction (the direction of the optical axis), respectively. The filter holding frames 170 and 171 further have guide holes 170*c* and 171*c* with which the guide shafts 120*c* and 121*c* of the fixing barrel 12 engage, respectively. The filter holding frames 170 and 171 can be rotated about the guide shafts 120*c* and 121*c*, respectively. The filter holding frames 170 and 171 are restricted from moving in the X-axis direction by the fixing barrel 12 and the cover member 25.

The filter holding frames 170 and 171 are driven by a drive unit (drive member) and are insertable into and removable from the light path of the lens. Specifically, the drive unit drives the filter holding frames 170 and 171 such that the infrared cut filter 18 or the dummy glass 19 moves between a position on the optical axis OA of the lens and a position retracted from the optical axis OA. In FIG. 2A, the infrared cut filter 18 is disposed on the optical axis OA. The filter holding frames 170 and 171 move on a plane orthogonal to the optical axis OA of the lens. The configuration of the drive unit will be described below.

The actuator 20, such as a motor, that serves as a drive source rotates the filter holding frames 170 and 171 around the guide shafts 120*c* and 121*c*. The actuator 20 is connected to a flexible printed board 21.

The cover member 25 is fastened to the fixing barrel 12 by screws 28 (FIG. 3). The cover member 25 is arranged between the imaging element substrate 14 and the drive unit.

Figure 6:
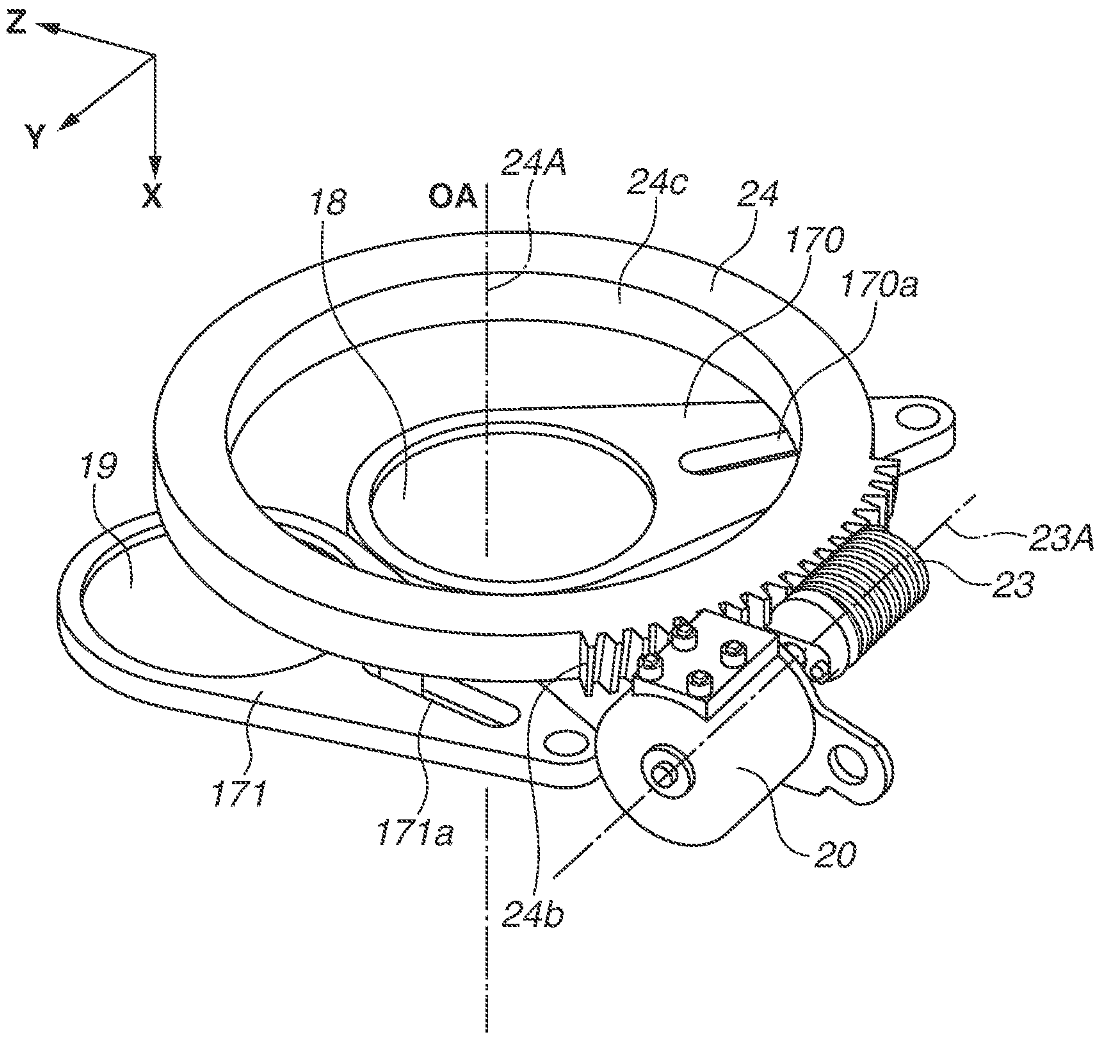
FIG. 6 is a perspective view illustrating arrangement of the filter holding frame, the worm, and the worm wheel according to the first exemplary embodiment.

Next, the drive unit will be described in detail. FIG. 6 is a perspective view illustrating arrangement of the filter holding frames 170 and 171, a worm 23, and the intermediate gear unit 24.

Figures 5A, 5B, 5C:
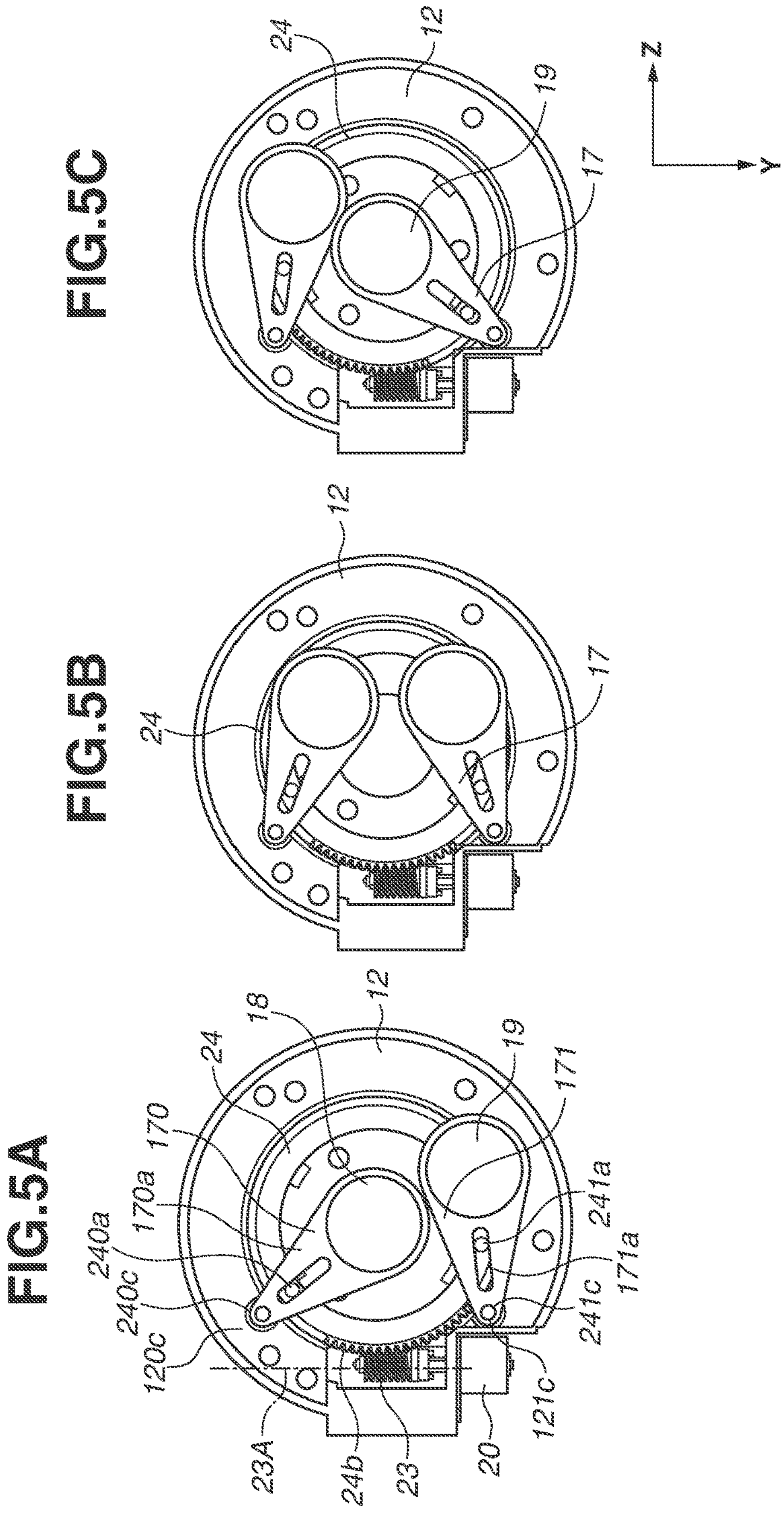
FIGS. 5A to 5C are diagrams illustrating arrangement of a filter holding frame, a worm, and a worm wheel at the time of filter switching driving according to the first exemplary embodiment.

The drive unit (drive member) includes the actuator 20, the worm (cylindrical worm) 23 fixed to the actuator 20, and the intermediate gear unit (rotation member) 24. The intermediate gear unit 24 has a worm wheel (helical gear) 24*b* and engagement pins 240*a* and 241*a* (engagement portions) (FIG. 5A).

The worm 23 is coupled to the actuator 20 and is rotated integrally with the actuator 20. The worm 23 is a gear that is threaded like a screw and has a small number of teeth. The direction of a rotation axis 23A of the worm 23 is identical (parallel) to the Y-axis direction that is the drive direction of the filter holding frames 170 and 171. Accordingly, the long-side direction of the actuator 20 and the drive direction of the filter holding frames 170 and 171 are the same direction, which can make it possible to reduce the size of the imaging apparatus 1.

The intermediate gear unit 24 is restricted from moving in the direction of the optical axis OA by the fixing barrel 12 and the cover member 25. The intermediate gear unit 24 is restricted from moving in the direction perpendicular to the optical axis OA by a projection (not illustrated) protruding from the fixed lens barrel. The fixing barrel 12 and the cover member 25 are fastened and fixed together by the screws 28. The intermediate gear unit 24 has a circular shape (cylindrical shape) with an opening 24*c* therein, and the worm wheel 24*b* that engages with the worm 23 is formed in a part of the outer peripheral portion of the intermediate gear unit 24. The opening 24*c* penetrates through the intermediate gear unit 24 in the direction of the optical axis OA of the lens.

A rotation axis 24A (FIG. 6) of the worm wheel 24*b* is substantially coaxial with the optical axis OA. Specifically, as illustrated in FIG. 6, the worm wheel 24*b* has the rotation axis 24A that is substantially identical to the optical axis OA. The worm wheel 24*b* engages with the worm 23 and constitutes a worm gear together with the worm 23.

The engagement pins 240*a* and 241*a* are integrated with the worm wheel 24*b* and thus rotate along with the rotation of the worm wheel 24*b*. The engagement pins 240*a* and 241*a* engage with the engagement holes 170*a* and 171*a* formed in the filter holding frames 170 and 171, respectively.

The worm wheel 24*b* is located at the position more distant from the optical axis OA than the engagement pins 240*a* and 241*a*. In other words, the engagement pins 240*a* and 241*a* are located further inward in a radial direction of the intermediate gear unit 24 than the worm wheel 24*b*. With this arrangement, the filter holding frames 170 and 171 and the drive unit can set within a certain area as viewed from the direction of the optical axis OA. Accordingly, the camera unit 2 and the imaging apparatus 1 can be reduced in size.

With the configuration described above, the driving force of the actuator 20 is transmitted to the filter holding frames 170 and 171 via the worm 23 and the intermediate gear unit 24. The worm gear can regulate the transmission of the rotation from the worm wheel 24*b* side to the worm 23 side by adjusting the lead angle of the groove in the worm 23 (self-lock function). That is, a load P necessary to rotate the worm 23 can be increased by adjusting the lead angle of the groove in the worm 23. For example, the load P necessary to rotate the worm 23 is made greater than the load applied to the filter holding frames 170 and 171 in the direction of insertion and removal of the filter holding frames 170 and 171 when the camera unit 2 undergoes impact or vibration.

This suppresses the accidental insertion and removal of the filter holding frames 170 and 171. Since the drive unit also acts as a lock mechanism as described above, there is no need to separately provide a lock mechanism. This makes it possible to reduce the sizes of the imaging apparatus 1 and the camera unit 2. In addition, the worm wheel 24*b* may be made large in size to increase the reduction ratio of the worm gear. In this case, the motor can be driven with further smaller electric power and the load P that can be regulated by the self-lock function can be further increased.

Next, a filter switching operation according to the present exemplary embodiment will be described with reference to FIGS. 5A, 5B and 5C. FIGS. 5A to 5C are diagrams illustrating arrangement of the filter holding frames, the worm, and the worm wheel at the time of filter switching driving according to the present exemplary embodiment. When a drive signal is input to the actuator 20 via electrical wiring (not illustrated) connected to the imaging element substrate 14, a rotor of the actuator 20 rotates around the rotation axis 23A. When the rotor of the actuator 20 rotates, the worm 23 fixed in the rotation axis 23A and the worm wheel 24*b* (the intermediate gear unit 24) engaging with the worm 23 also rotate. When the intermediate gear unit 24 rotates, the filter holding frames 170 and 171 are rotated around the guide shafts 120*c* and 121*c* in the +Y direction or the −Y direction via the engagement pins 240*a* and 241*a* and the engagement holes 170*a* and 171*a*, respectively. In addition, a drive signal is input to the actuator 20 so as to stop the filter holding frames 170 and 171 after they move by a predetermined amount.

Figure 4:
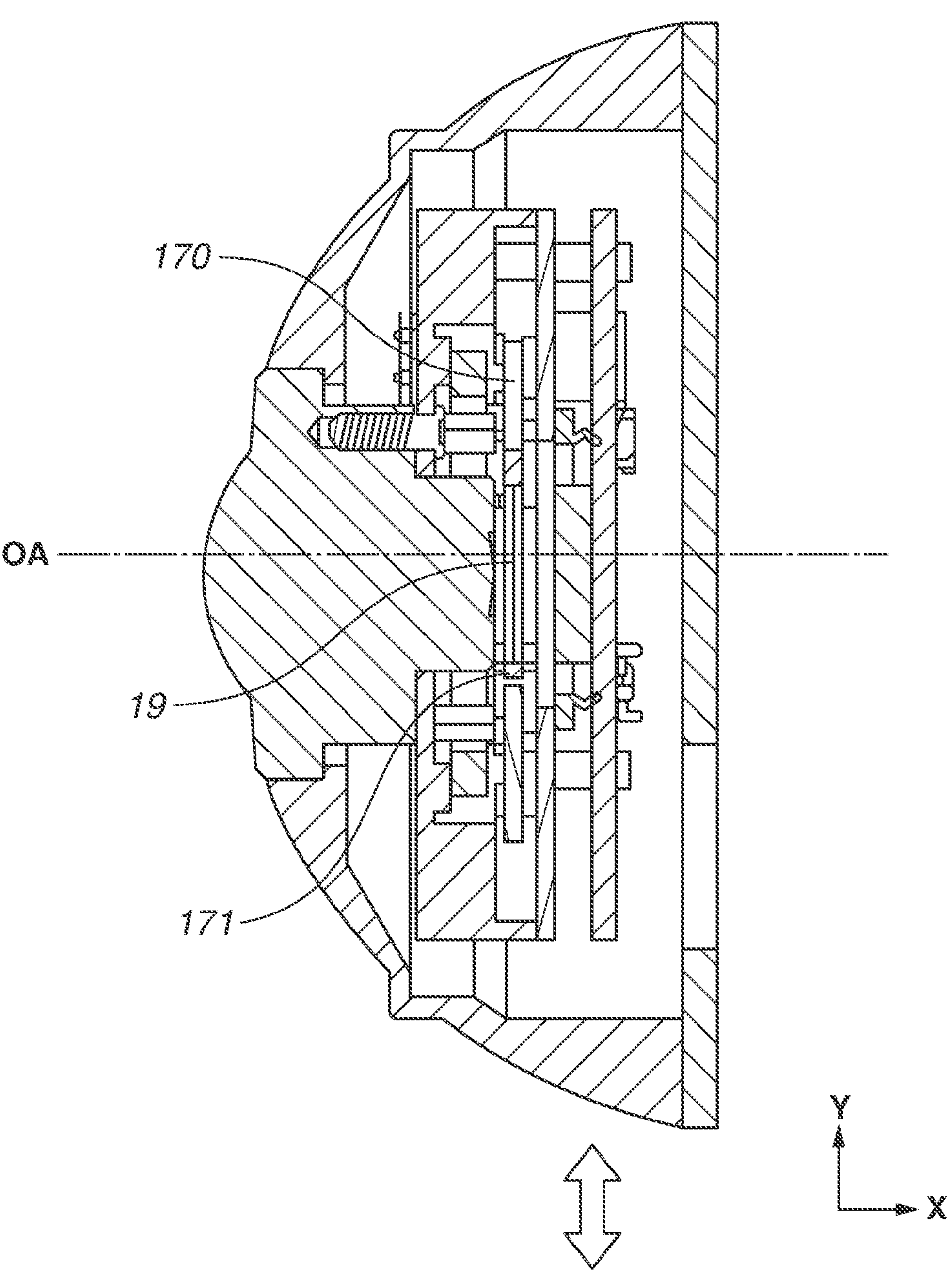
FIG. 4 is a cross-sectional view of the camera unit according to the first exemplary embodiment, and illustrates a state where dummy glass is inserted into the light path.

FIGS. 2B and 5A illustrate a state where the infrared cut filter 18 is inserted into the light path (the optical axis OA), and FIGS. 4 and 5C illustrate a state where the dummy glass 19 is inserted into the light path. When the filter holding frames 170 and 171 are driven in the directions orthogonal to the optical axis shown by a bidirectional arrow in FIG. 4, the infrared cut filter 18 and the dummy glass 19 are selectively inserted into the light path. FIG. 5B illustrates an intermediate state of transition from the state in FIG. 5A to the state in FIG. 5C in which the filter holding frames 170 and 171 are inserted into the light path.

Subsequently, further details of the lens barrel unit 5 will be described with reference to FIGS. 7 and 8.

Figure 7:
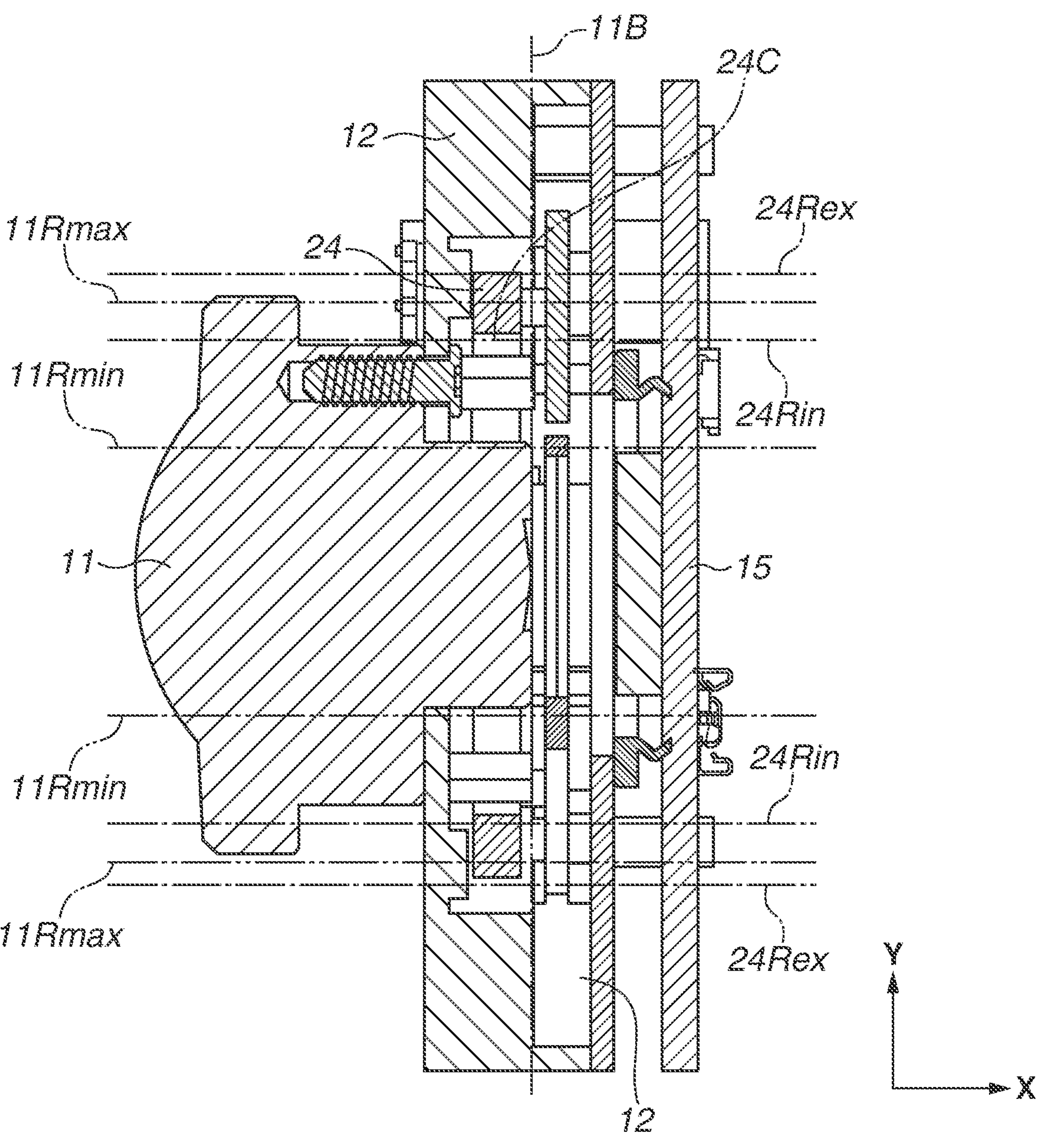
FIG. 7 is a cross-sectional view of the lens barrel unit according to the first exemplary embodiment.

FIG. 7 is a cross-sectional view of the lens barrel unit 5 along the optical axis OA. An internal diameter 24Rin of the cylinder of the intermediate gear unit 24 in the present exemplary embodiment is larger than a minimum external diameter 11Rmin of the lens unit 11 (11Rmin<24Rin).

Accordingly, the intermediate gear unit 24 can be arranged without intersecting the light beam from the lens included in the lens unit 11. A portion of the lens unit 11 is inserted into the cylinder of the intermediate gear unit 24. In other words, a portion of the lens unit 11 is arranged in the opening (in the opening 24$c$) of the intermediate gear unit 24 (the rotation member). In this manner, since a portion of the lens unit 11 can be inserted into the cylinder of the intermediate gear unit 24, the entire length of the lens barrel unit 5 from the object side of the lens unit 11 to the imaging element substrate 14 determined by the length in the X-axis direction can be shortened. As a result, even if the front-side holder 3 and the back-side holder 4 form the substantially hemispherical shape as illustrated in FIG. 2B, the intermediate gear unit 24, the actuator 20, and the worm 23 can be stored inside the space formed by the front-side holder 3 and the back-side holder 4. This enables the lens barrel unit 5 to be thinner or smaller.

Figure 8A:
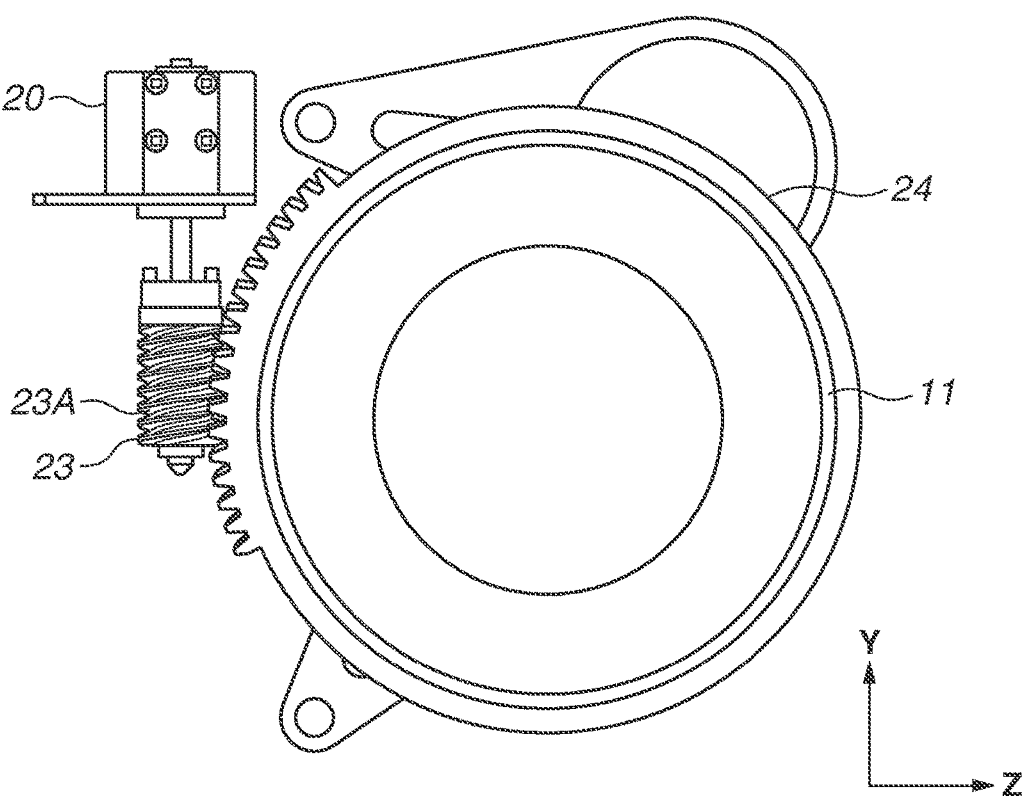
FIGS. 8A and 8B are a front view and a side view illustrating arrangement of the filter holding frame, the worm, the worm wheel, and a lens unit of the first exemplary embodiment, respectively.
Figure 8B:
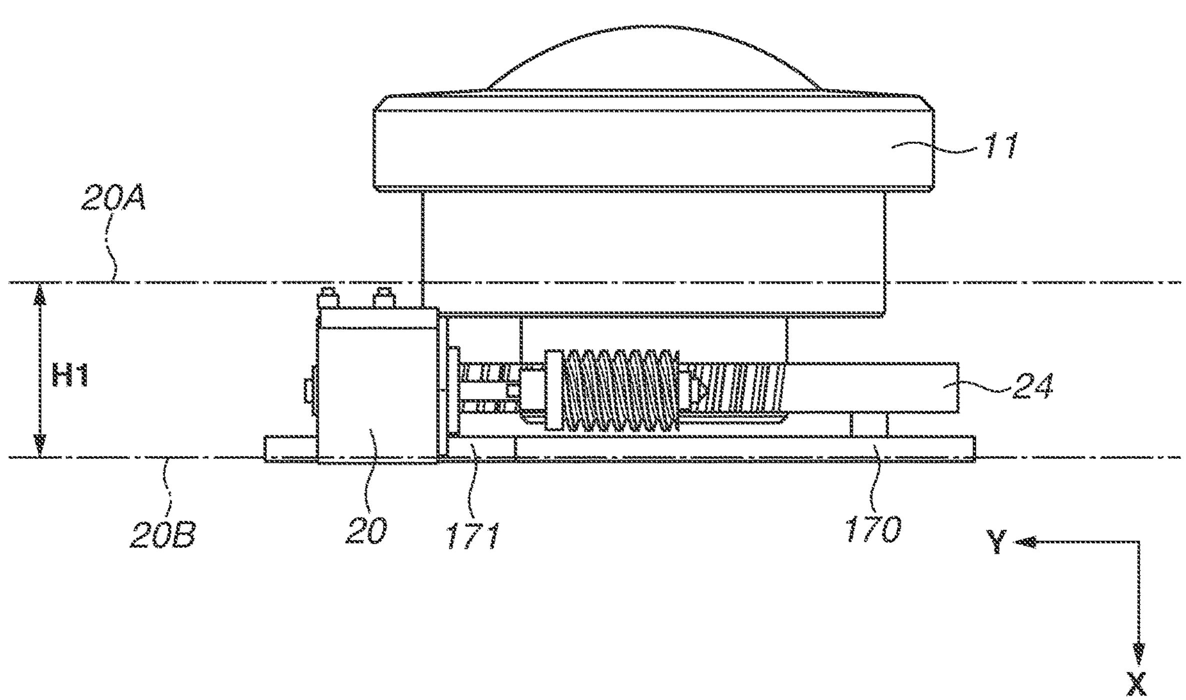

FIG. 8A is a front view of the camera unit 2 as viewed from the object side in the direction of the optical axis OA with the fixing barrel 12 and the cover member 25 omitted. FIG. 8B is a diagram illustrating the camera unit 2 as viewed from the −Z direction perpendicular to the optical axis OA with the fixing barrel 12 and the cover member 25 omitted. In the lens barrel unit 5 according to the present exemplary embodiment, as illustrated in FIG. 8A, the lens unit 11 and the intermediate gear unit 24 overlap when viewed from the front side (the object side in the direction of the optical axis OA). The lens unit 11 and the intermediate gear unit 24 are preferably arranged such that the maximum external diameter 11Rmax of the lens unit 11 falls between the internal diameter 24Rin and external diameter 24Rex of the intermediate gear unit 24 (24Rin<11Rmax<24Rex). In other words, when the inner diameter of the intermediate gear unit 24 is defined as R1, the external diameter of the intermediate gear unit 24 is defined as R2, and the maximum external diameter R3 of the lens unit 11 is defined as R3, R1<R3<R2 is satisfied.

Arranging the components in this manner enables the lens barrel unit 5 to be thinner or smaller without increasing the outer diameter. In addition, as illustrated in FIG. 8B, when viewed from the direction perpendicular to the optical axis OA, the filter holding frames 170 and 171 and the intermediate gear unit 24 are preferably arranged so as to overlap in the range between an object side end 20A to an imaging side end 20B of the actuator 20. Specifically, when the range of the actuator 20 with respect to the direction of the optical axis OA is defined as H1, the filter holding frames 170 and 171 and the intermediate gear unit 24 are partially within the range H1. As a result, the lens barrel unit 5 according to the present exemplary embodiment can be made thinner or smaller.

Next, a lens barrel unit according to a second exemplary embodiment of the present disclosure, which is different from the first exemplary embodiment, will be described. The second exemplary embodiment is similar in basic configuration to the first exemplary embodiment. However, the second exemplary embodiment is different from the first exemplary embodiment in the shapes of the engagement holes 170$a$ and 171$a$ of the filter holding frames 170 and 171.

The shapes of engagement holes 1700$a$ and 1710$a$ according to the present exemplary embodiment are each an arc shape (curved shape) like a V shape. The engagement holes 1700$a$ and 1710$a$ engage with engagement pins 2400$a$ and 2410$a$. This shape allows both filter holding frames 1700 and 1710 (FIGS. 9A to 9C) to be not inserted into the light path, unlike in the state of FIG. 5B.

Figures 9A, 9B, 9C:
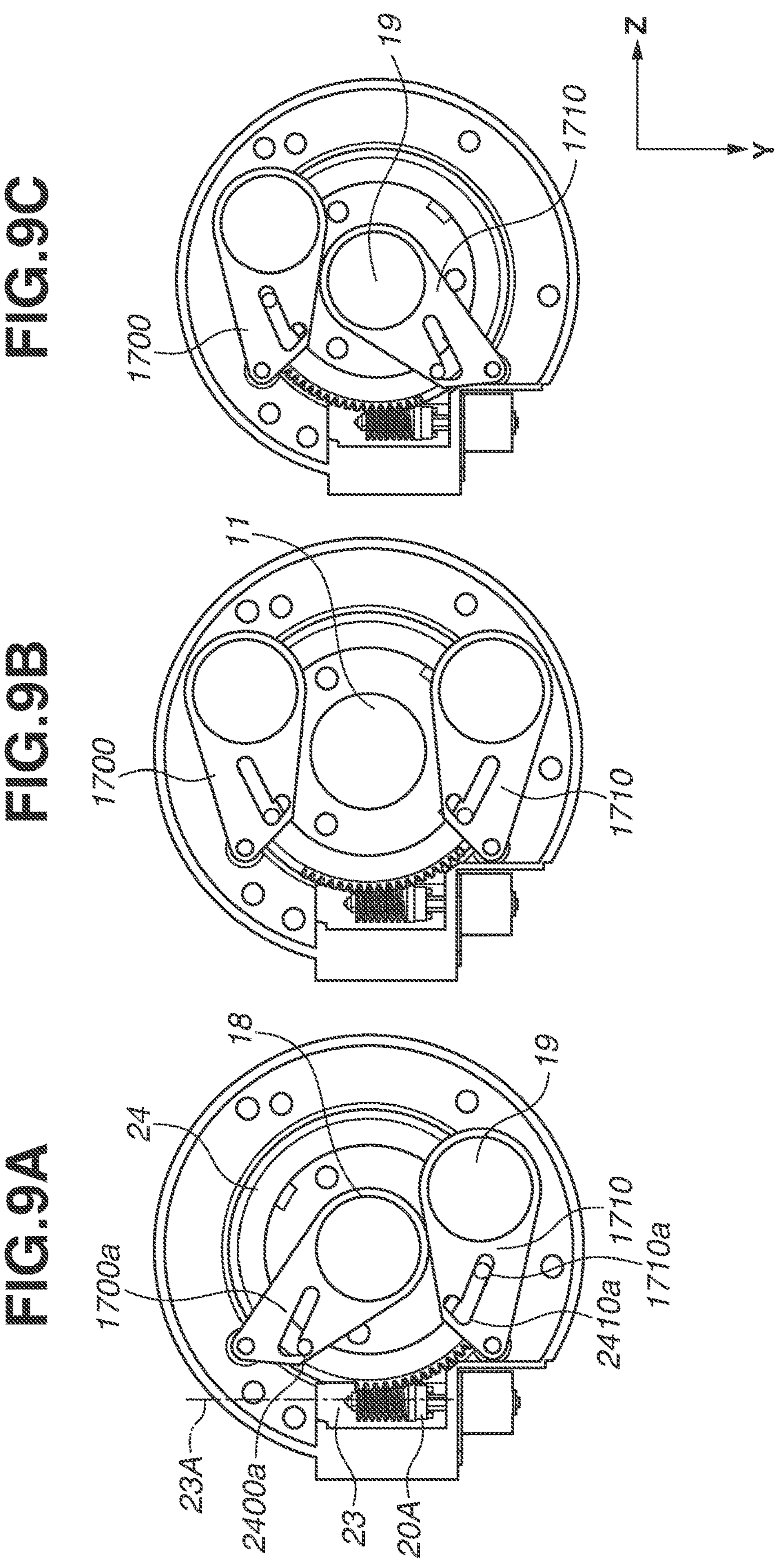
FIGS. 9A to 9C are diagrams illustrating arrangement of a filter holding frame, a worm, and a worm wheel at the time of filter switching driving according to a second exemplary embodiment.

A filter switching operation according to the present exemplary embodiment will be described with reference to FIGS. 9A, 9B and 9C. FIGS. 9A to 9C are diagrams illustrating arrangement of filter holding frames, a worm, and a worm wheel at the time of filter switching driving according to the present exemplary embodiment. When a drive signal is input to an actuator 20 via electrical wiring (not illustrated) connected to an imaging element substrate 14, a rotor of the actuator 20 rotates around a rotation axis 23A. When the rotor of the actuator 20 rotates, a worm 23 fixed in the rotation axis 23A and a worm wheel 24$b$ (intermediate gear unit 24) engaging with the worm 23 rotate. When the intermediate gear unit 24 rotates, the filter holding frames 1700 and 1710 are rotated around guide shafts 120$c$ and 121$c$ in the +Y direction or the −Y direction via the engagement pins 2400$a$ and 2410$a$ and the engagement holes 1700$a$ and 1710$a$, respectively. A drive signal is input to the actuator 20 such that the filter holding frames 1700 and 1710 stop after they move by a predetermined amount.

FIG. 9A illustrates a state where an infrared cut filter 18 is inserted into the light path (the optical axis OA), and FIG. 9C illustrates a state where dummy glass 19 is inserted into the light path. When the filter holding frames 1700 and 1710 are driven in the directions orthogonal to the optical axis OA shown by the bidirectional arrow in FIG. 4, the infrared cut filter 18 and the dummy glass 19 are selectively inserted into the light path. FIG. 9B illustrates an intermediate state of transition between the state in FIG. 9A and the state in FIG. 9C. In this state, the engagement pins 2400$a$ and 2410$a$ are arranged at positions on the bottoms of the V shaped engagement holes 1700$a$ and 1710$a$, respectively, and the filter holding frames 1700 and 1710 are not inserted into the light path. As a result, the image converted by an imaging element 15 will be let directly pass through the lens barrel unit 5 under no influence of the filter holding frames 1700 and 1710 (unfiltered state).

As a result, the lens barrel unit 5 according to the second exemplary embodiment can be brought into three states, i.e., the state with insertion of the infrared cut filter 18, the state with insertion of the dummy glass 19, the unfiltered state. In other words, the three states are the state where the infrared cut filter 18 is inserted into the light path, the state where the dummy glass 19 is inserted into the light path, and the state where none of the infrared cut filter 18 and the dummy glass 19 is inserted into the light path.

Other Exemplary Embodiments

Since the worm wheel 24$b$ has a cylindrical shape, the worm may be provided on the outer periphery of the lens unit, for example. In addition, although the optical axis OA and the rotation axis 24A of the intermediate gear unit 24 are substantially identical in the foregoing examples, it suffices that the optical axis OA is included in the cylinder of the intermediate gear unit.

As the infrared cut filter 18 and the dummy glass 19, optical members such as ND filters and bandpass filters may be used. The optical elements are not limited in particular, and optical filters, various types of glass, or lenses that transmit light of a specific wavelength can be used.

In the worm gear, the worm and the helical gear (worm wheel) may be in point contact or line contact with each other. The worm may be a cylindrical worm or a double enveloping worm. The movement directions of the optical elements are not limited and may include the components of the direction of the optical axis and other direction.

FIG. 6 illustrates the engagement pins 240*a* and 241*a* and the engagement holes 170*a* and 171*a* that are arranged in the −Z direction, but they may be arranged in the +Z direction. The intermediate gear unit 24 may have engagement holes, and the filter holding frames 170 and 171 may include engagement pins.

In the above-described exemplary embodiments, the lens unit 11 and the fixing barrel 12 are separated. Alternatively, they may be integrated.

Some exemplary embodiments of the present disclosure have been described above. However, the present disclosure is not limited to these exemplary embodiments and can be modified and changed within the scope of the gist of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-066475, filed Apr. 14, 2023, which is hereby incorporated by reference herein in its entirety.

What is claimed is:

1. A lens barrel unit comprising:

a lens unit including at least one lens;

an optical-filter holding member configured to hold an optical filter and insertable into and removable from a light path of the at least one lens; and a drive member configured to insert or remove the optical-filter holding member into or from the light path, wherein the drive member includes a drive source, a worm coupled to the drive source, and a rotation member that has a worm wheel configured to engage with the worm, wherein the rotation member includes a circular shaped opening penetrating in a direction of an optical axis of the at least one lens, and an engagement portion that is located further inward in a radial direction of the rotation member than the worm wheel, wherein the optical-filter holding member includes an engaged portion configured to engage with the engagement portion, and wherein at least part of the lens unit is arranged within the opening.

2. The lens barrel unit according to claim 1, wherein the worm wheel is provided in a part of an outer peripheral portion of the rotation member.

3. The lens barrel unit according to claim 1, wherein the engagement portion is an engagement pin, and the engaged portion is an engagement hole configured to engage with the engagement pin.

4. The lens barrel unit according to claim 3, wherein the engagement hole has a curved shape.

5. The lens barrel unit according to claim 1, wherein R1<R3<R2 is satisfied where an inner diameter of the rotation member is defined as R1, an outer diameter of the rotation member is defined as R2, and a maximum outer diameter of the lens unit is defined as R3.

6. The lens barrel unit according to claim 1, wherein an inner diameter of the rotation member is larger than a minimum outer diameter of the lens unit.

7. The lens barrel unit according to claim 1, wherein the optical-filter holding member includes a first optical-filter holding member configured to hold a first optical filter and a second optical-filter holding member configured to hold a second optical filter, and wherein the first optical-filter holding member and the second optical-filter holding member are configured to be moved on a plane orthogonal to the optical axis of the at least one lens.

8. The lens barrel unit according to claim 7, wherein the drive member is configured to drive the first optical-filter holding member and the second optical-filter holding member (i) such that the first optical-filter holding member is inserted into the light path, (ii) such that the second optical-filter holding member is inserted into the light path, or (iii) such that none of the first optical-filter holding member and the second optical-filter holding member is inserted into the light path.

* * * * *